United States Patent [19]

Rutten et al.

[11] Patent Number: 5,649,313
[45] Date of Patent: Jul. 15, 1997

[54] TELEVISION RECEIVER WITH SAW FILTER COUPLING UTILIZING A SERIES RESONANCE NETWORK AND ADDITIONAL RESISTOR

[75] Inventors: Peter J. H. Rutten; Eduard F. Stikvoort, both of Eindhoven, Netherlands

[73] Assignee: U.S. Philips Corporation, New York, N.Y.

[21] Appl. No.: 574,799

[22] Filed: Dec. 19, 1995

[30] Foreign Application Priority Data

Dec. 23, 1994 [EP] European Pat. Off. ............. 94203747

[51] Int. Cl.⁶ .................. H04B 1/16; H03H 9/64
[52] U.S. Cl. .................. 455/339; 455/295; 333/194; 310/313 B; 348/731
[58] Field of Search .................. 333/193, 194, 333/195, 196; 348/731; 455/280, 281, 303, 306, 338, 339, 295; 310/313 R, 313 B, 313 C, 313 D

[56] References Cited

U.S. PATENT DOCUMENTS 4,063,202  12/1977  Vasile .................. 333/194

FOREIGN PATENT DOCUMENTS 0237211  9/1990  Japan .................. 333/193

OTHER PUBLICATIONS

Hazama et al., "Design and Mass Productive Fabrication Techniques of High Performance SAW TV IF Filter"; 1978 *Ultrasonics Symposium Proceedings, IEEE Cat. #78CH1344-1SU*; Cherry Hill, NJ, USA; 25–27 Sep. 1978; pp. 504–508.

*Primary Examiner*—Robert Pascal
*Assistant Examiner*—Barbara Summons
*Attorney, Agent, or Firm*—Edward W. Goodman

[57] ABSTRACT

In a television receiver a SAW filter (FSAW) is preceded by a coupling network (CNW). The coupling network (CNW) includes an inductor (LP) between two input terminals of the SAW filter (IS1, IS2). It further includes a series resonance circuit (SRC) coupled to at least one of the input terminals (IS1). In order to reduce signal distortion a resistor (RP) is coupled between the two input terminals (IS1, IS2). Alternatively, a resistor (RS) is coupled in parallel to the series resonance circuit (SRC).

7 Claims, 10 Drawing Sheets

1

TELEVISION RECEIVER WITH SAW FILTER COUPLING UTILIZING A SERIES RESONANCE NETWORK AND ADDITIONAL RESISTOR

BACKGROUND OF THE INVENTION

1. Field of the Invention

The invention relates to a receiver which comprises a Surface Acoustic Wave (SAW) filter to suppress signals frequency adjacent to a desired signal. SAW filters provide good selectivity combined with a substantially constant group delay. This makes them particularly suited for use in television receivers.

The invention further relates to a filter arrangement which comprises a SAW filter and a coupling network for supplying an input signal to the SAW falter.

2. Description of the Related Art

The "Kokai" publication No. 2-237,211 describes a filter arrangement which, in principle, can be used in a television receiver. The Figure accompanying the English abstract of this publication, which shows the prior art filter arrangement, constitutes FIG. 1 of this specification.

In the prior art filter arrangement, a coupling network 14 is coupled in series with a SAW filter constituted by a piezoelectric substrate 11 on which an input electrode 12 and an output electrode 13 are placed. The coupling network 14 comprises an inductor 16 coupled in parallel to the two input terminals of the SAW filter. The inductor 16 is chosen such that it cancels the capacitance of the electrode 12. Furthermore, a series resonance circuit, formed by an inductor 17 and a capacitor 18, is coupled in series with one of the input terminals. In the cited "Kokai" publication, it is claimed that this filter arrangement has a favorable insertion loss when properly dimensioned.

However, it has been proven in practice that a television receiver equipped with the prior art filter arrangement performed unsatisfactorily.

SUMMARY OF THE INVENTION

An object of the invention is to provide a receiver, in particular a television receiver, which performs better than a receiver equipped with the prior art filter arrangement. Such a receiver which comprises a tuner for converting a reception signal into an intermediate frequency signal; a filter arrangement for filtering the intermediate frequency signal to obtain a filtered intermediate frequency signal; and a demodulation section for providing a baseband signal in response to the filtered intermediate frequency signal; characterized in that the filter arrangement comprises a surface acoustic wave filter with two input terminals, an inductor coupled between the two input terminals; a series resonance network coupled to transfer the intermediate frequency signal to at least one of the two input terminals; and a resistor coupled between the two input terminals. In another embodiment, the receiver comprises a tuner for converting a reception signal into an intermediate frequency signal; a filter arrangement for filtering the intermediate frequency signal to obtain a filtered intermediate frequency signal; and a demodulation section for providing a baseband signal in response to the filtered intermediate frequency signal; characterized in that the filter arrangement comprises a surface acoustic wave filter with two input terminals; an inductor coupled between the two input terminals; a series resonance network coupled to transfer the intermediate frequency signal to at least one of the two input terminals; and a resistor coupled in parallel to the series resonance network. In addition, the invention provides a filter arrangement which comprises a surface acoustic wave filter with two input terminals; an inductor coupled between the two input terminals; and a series resonance network coupled to transfer an input signal to at least one of the two input terminals; characterized in that a resistor (RP) is coupled between the two input terminals. In another embodiment, the filter arrangement comprises a surface acoustic wave filter with two input terminals; an inductor coupled between the two input terminals; and a series resonance network coupled to transfer an input signal to at least one of the two input terminals; characterized in that a resistor is coupled in parallel to the series resonance network.

Briefly, in the invention, a resistor is coupled in parallel to the input terminals of the SAW filter or, alternatively, a resistor is coupled in parallel to the series resonance circuit. A combination of both measures is also possible, that is, a resistor in parallel with the input terminals and a further resistor in parallel with the resonance circuit.

The following recognition underlies the invention. The unsatisfactory performance of the television receiver equipped with the prior art filter arrangement, is due to signal distortion caused by the filter arrangement. Further, it is recognized that the SAW filter in the arrangement puts constraints on some characteristics which relate to signal distortion. These characteristics are the following. First, the transfer of a voltage at the input of the filter arrangement to the input terminals of the SAW filter via the coupling network. Second, the equivalent source impedance seen at the input of the SAW filter. Third, the input impedance of the filter arrangement.

The resistor added in accordance with the invention, provides a degree of freedom which allows the above-identified characteristics to be set satisfactorily in view of distortion. In addition, the invention provides further advantages. A further advantage is that the above-identified characteristics are less sensitive to component spread. Yet a further advantage is that the frequency response of the filter arrangement is substantially in line with the specification of the SAW filter used therein.

Adding a resistor to the prior art filter arrangement may seem unwise in view of noise and insertion loss. It is known that a resistor is a noise source in itself and, furthermore, that it dissipates signal power when arranged in a signal path, hence, causing signal loss. Indeed, the filter arrangement according to the invention has a noise figure which is slightly deteriorated vis-a-vis the prior art. However, this mainly applies to frequencies outside the pass band. Hence, the signal-to-noise ratio of a desired signal within the pass band is substantially not affected. This is because the noise of a resistor added in accordance with the invention is effectively short circuited in the pass band. Furthermore, it is possible to arrange the resistor such that the desired signal in the pass band effectively by-passes this resistor. In that case, the resistor mainly dissipates power of signals outside the pass band which are undesired. Consequently, the insertion loss with respect to the desired signal is substantially not affected.

These and other aspects and advantages of the invention will be apparent from and elucidated with reference to the embodiments described hereinafter.

DESCRIPTION OF THE PREFERRED EMBODIMENTS

Like reference signs designate like elements throughout the drawings.

Figure 1:
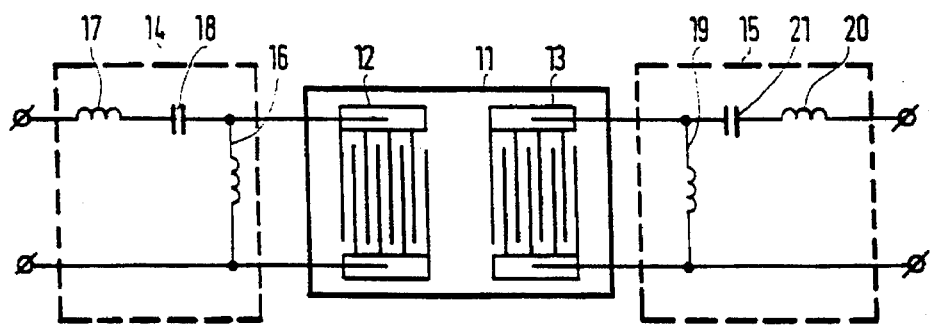
FIG. 1 shows a prior art filter arrangement.

First, deficiencies of the prior art filter arrangement, shown in FIG. 1, will be analyzed in more detail with reference to characteristics shown in FIGS. 2a to 2d. Subsequently, the single general inventive concept, which counters these deficiencies, will further be explained. Next, three embodiments of filter arrangements according to the invention, respectively shown in FIGS. 3, 4 and 5, will be described. Next, the application of each of these filter arrangements in a television receiver, shown in FIG. 6, is considered. Next, advantages provided by the invention are highlighted with reference to exemplary characteristics of these three applications, respectively shown in FIGS. 7a to 7d, FIGS. 8a to 8d and FIGS. 9a to 9d. Finally, some variants to the embodiments shown by way of example are touched upon.

Here below a television receiver (TV) application of the prior art filter arrangement, shown in FIG. 1, is discussed in greater detail. In the application, the prior art filter arrangement is used to filter an intermediate frequency (IF) signal in the TV. The TV IF signal is approximately 40 MHz in most European countries. The bandwidth of the IF signal is approximately 6 Mhz. Suitable TV SAW filters are commercially available which include the piezo-electric substrate 11 with electrodes 12 and 13, shown in FIG. 1. These TV SAW filters typically have an input impedance which can be modelled as an input capacitance CI of 20 picoFarad and an input resistance RI of 1 kiloOhm in parallel. Thus, the input capacitance CI represents the imaginary part of the input impedance and the input resistance RI, coupled in parallel, represents the real part.

In the TV application, the values of the discrete electrical components in which constitute the coupling network 14, shown in FIG. 1, are as chosen as follows. The value Lp of the inductor 16 is 791.6 nanoHenry. The inductor 16 and the input capacitance CI, not shown in FIG. 1, constitute a parallel resonance circuit which, accordingly, is tuned to 40 MHz. Thus, the input capacitance CI of the TV SAW filter 11,12,13 is substantially cancelled at the IF. The series resonance circuit, formed by inductor 17 and capacitor 18, is also tuned to 40 MHz.

FIGS. 2a to 2d show characteristics for various combinations of values of inductor 17 and capacitor 18, Ls and Cs, respectively. Each combination of values is characterized by a parameter R, which defines the values Ls and Cs as follows:

$$Ls = R \cdot Lp; \quad Cs = CI \div R$$

For example, when R=10 the values of the series resonance circuit are: Ls=7.91 microHenry and Cs=2 picoFarad. To obtain the characteristics shown in FIGS. 2a to 2d, a voltage source, not shown in FIG. 1, is connected between the input terminals of the prior art filter arrangement. The voltage source represents a driver circuit, which supplies the TV IF signal to the prior art filter arrangement.

Figure 2A:
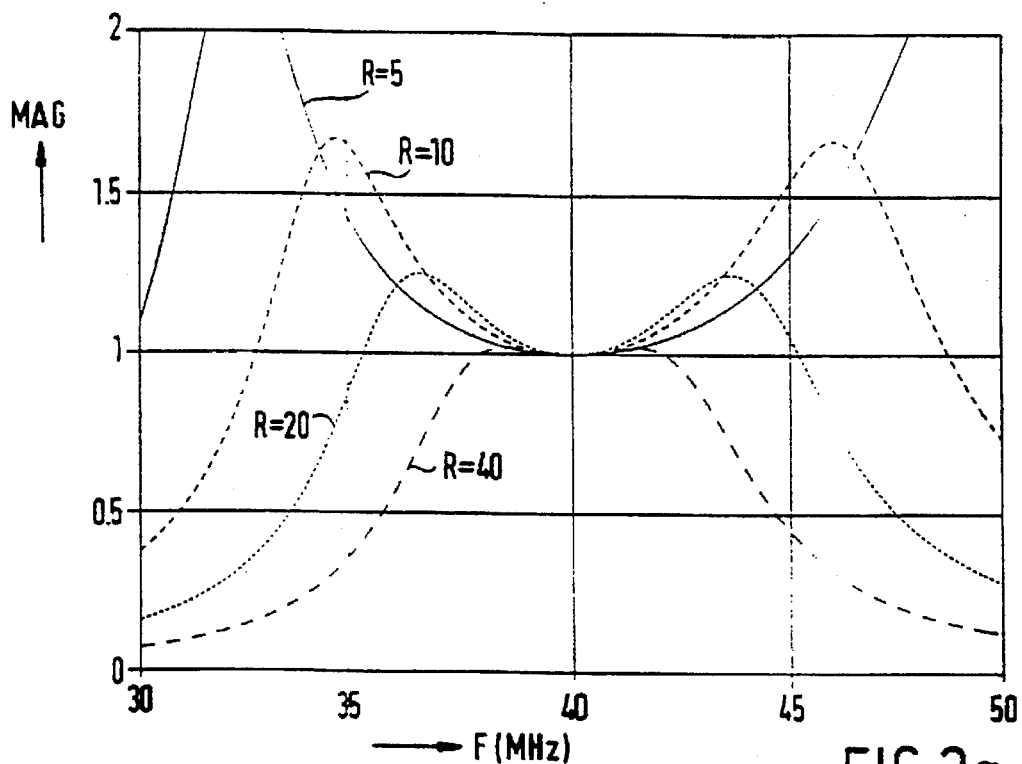
FIG. 2a illustrates voltage gain in the prior art filter arrangement.
Figure 2B:
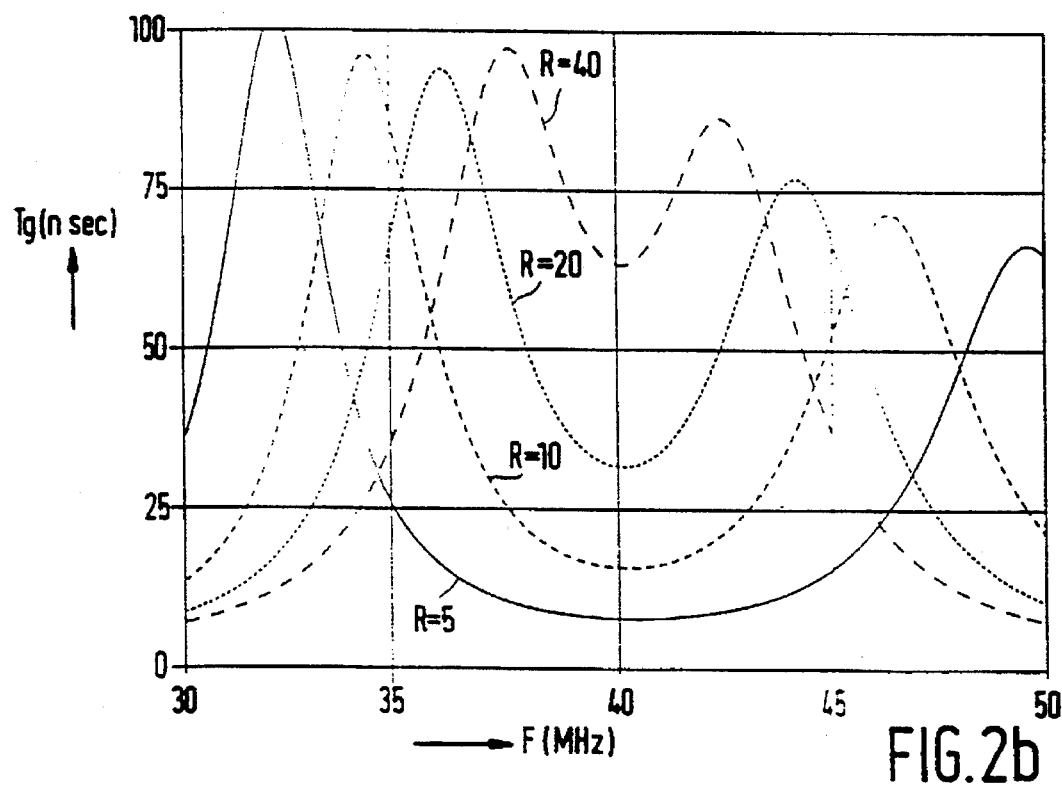
FIG. 2b illustrates group delay in the prior art filter arrangement.
Figure 2C:
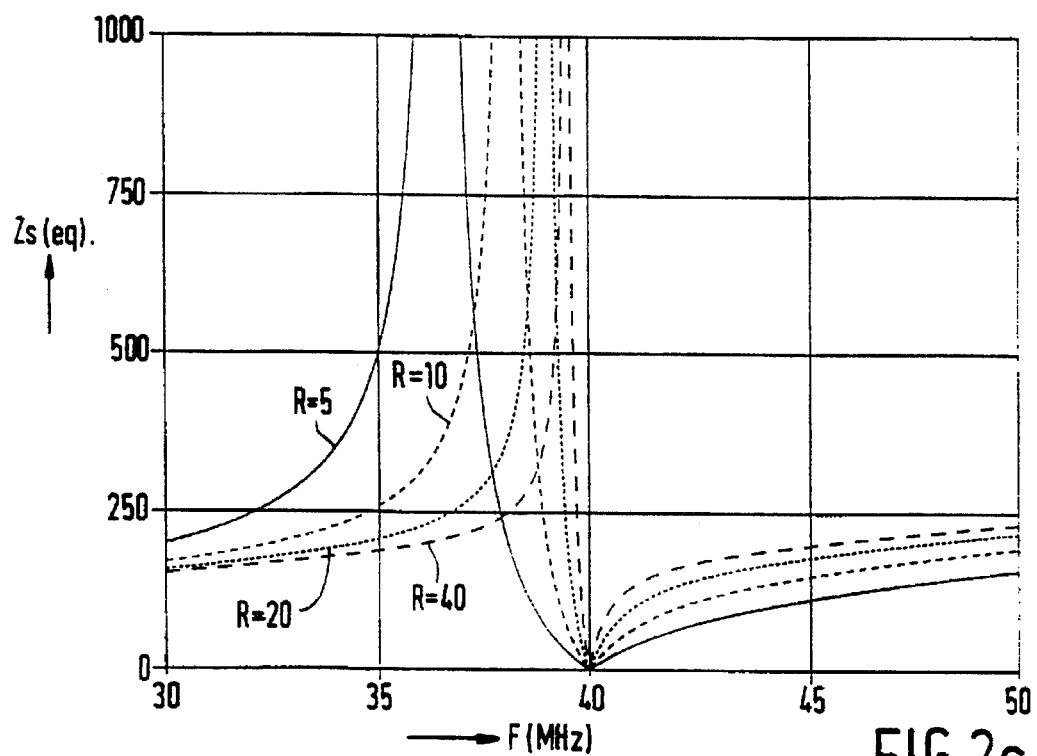
FIG. 2c illustrates the equivalent source impedance at the SAW filter input in the prior art filter arrangement.
Figure 2D:
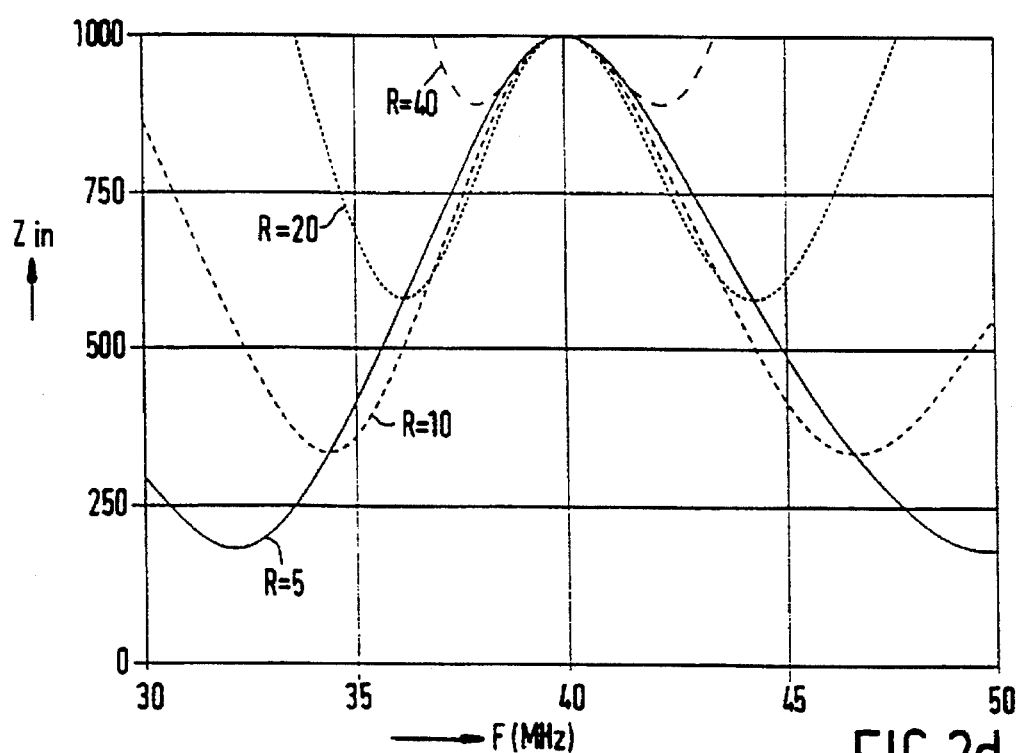
FIG. 2d illustrates the input impedance of the prior art filter arrangement.

FIGS. 2a and 2b illustrate characteristics of a signal transfer from the voltage source to the input of the TV SAW filter 11,12,13 via the coupling network 14. Fig. 2a is a graph of the magnitude of this transfer against frequency (F). FIG. 2b is a graph of the group delay (Tg) of this transfer against frequency (F). FIG. 2c is a graph of the equivalent source impedance Zs(eq), seen at the input of the TV SAW filter 11,12,13, against frequency (F). The equivalent source impedance Zs(eq) corresponds to the output impedance of the coupling circuitry 14 with the voltage source coupled thereto. FIG. 2d is a graph of the magnitude of input impedance Zin of the prior art filter arrangement against frequency (F). The input impedance Zin is the impedance measured between the input terminals of the prior art filter arrangement shown in FIG. 1.

FIG. 2a shows that within a desired pass band of approximately 37-43 MHz, the magnitude-frequency response is not flat for any value of parameter R. Furthermore, it appears that the more Ls and Cs approximate Lp and CI, respectively, the more significant peaks in this response become. The best magnitude-frequency response seems the one obtained with R=40. If parameter R is lower, peaks outside the desired pass band occur. These peaks raise the level of undesired signals which may produce interference on a displayed picture. On the other hand, if parameter R is higher than 40, the desired passband is no longer achieved. This may result in less sharp contours in a displayed picture.

FIG. 2b shows that the group delay is substantially constant, within the desired pass band, only for relatively high values of parameter R. When R=20 and R=40, the group delay varies considerably over the desired pass-band. This may result in distortions in the picture displayed. Image portions with a relatively high frequency content will be delayed with respect to image portions with a low frequency content. This will manifest itself on the picture display as a displacement of these respective image portions relative to each other.

FIG. 2c shows that the equivalent source impedance Zs(eq), seen at the input of the TV SAW filter 11,12,13, peaks at a specific frequency. The higher the value of the parameter R, the nearer the peak is to center frequency of the pass band. When the R exceeds 10, the peak falls within the pass band. This may result in ghost images in the picture displayed due to reflections in the TV SAW filter 11,12,13, which reflections produce undesired echo's at the output of the filter. This phenomena can be explained as follows.

In a SAW filter, an electrical signal generates an acoustic wave at the input electrode. The acoustic wave propagates to the output electrode and results in a desired output signal. However, a portion of the acoustic wave energy bounces back, that is, propagates back to the input electrode. Ideally, the input electrode should be short-circuited to prevent the acoustic wave from bouncing back again and propagating to the output electrode, where it would produce an undesired echo. The lower the terminating impedance at the SAW filter input, the more energy of the reflected acoustic waves is absorbed and, consequently, the more the undesired echo is suppressed.

FIG. 2d shows that the input impedance of the prior art filter arrangement exhibits dips which are symmetrically located around the center frequency of the pass-band. Starting off from R=40 these dips become more pronounced, when the value of parameter R decreases. Furthermore, the dips shift away from the center frequency. In particular, dips outside the pass band may cause interference in a displayed picture. This can be explained as follows.

In the frequency region of a dip, an undesired signal may occur, for example, a frequency adjacent television signal. Such an undesired signal is supplied to the prior art filter arrangement by a driver circuit, not shown in FIG. 1. Any practical driver circuit has a limited output current capability. Since the input impedance of the prior art filter arrangement is relatively low, the frequency adjacent signal may overload the driver circuit. That is, the signal clips at the output current limits. In that case, not only the frequency adjacent signal is distorted, but also the desired television signal itself. The lower the input impedance of the prior art filter arrangement, the lower the level of the frequency adjacent signal needs to be in order to produce noticeable interference.

In summary, in the TV application of the prior art filter arrangement, an unsatisfactory compromise has to be made. If the value of parameter R is relatively large, say R=40, the group delay varies appreciably in the desired band, as shown in FIG. 2b. Furthermore, the SAW filter input terminating impedance peaks within the desired band, as shown in FIG. 2c. On the other hand, if the value of parameter R is relatively small, say R=5, the coupling network provides gain for undesired frequency adjacent signals, as shown in FIG. 2a. Furthermore, the input impedance of the prior art filter arrangement drops significantly in a frequency region in which such an undesired signal may occur, as shown in FIG. 2d. In either case, the performance of the TV, equipped with the prior art filter arrangement, is adversely affected.

The invention takes the following into consideration. The characteristics shown in FIGS. 2a, 2b and 2d are effectively those of a band pass filter which not only includes the coupling network 14, but also the input capacitance CI, not shown in FIG. 1, of the TV SAW filter 11,12,13. This band-pass filter is effectively terminated by the input resistance RI, also not shown in FIG. 1. Thus, the characteristics shown in FIGS. 2a, 2b and 2d heavily depend on the input impedance of the TV SAW filter 11,12,13. However, the input impedance is of the TV SAW filter 11,12,13 cannot be fixed at will. The input impedance results from the constitution of the TV SAW filter 11,12,13, which is such that desired filter characteristics are obtained.

The single general inventive concept is to introduce additional freedom in setting the characteristics shown in FIGS. 2a to 2d, by effectively arranging a resistance in parallel to the SAW filter input. This can be done in various ways as illustrated by three embodiments shown in FIGS. 3, 4 and 5, respectively. The embodiments shown in FIGS. 3, 4 and 5, comprise a SAW filter FSAW having two input terminals IS1 and IS2, respectively. A coupling network CNW is coupled to transfer an input signal at input terminals IA1, IA2 to the input terminals IS1, IS2 of the SAW filter FSAW. The coupling network CNW is similar to the coupling network 14 shown in FIG. 1. It comprises an inductor LP, effectively coupled between the input terminals IS1, IS2, and a series resonance circuit SRC which comprises an inductor LS and a capacitor CS. The input capacitance CI and the input resistance RI of the SAW filter FSAW is shown in each of the FIGS. 3, 4 and 5.

Figure 3:
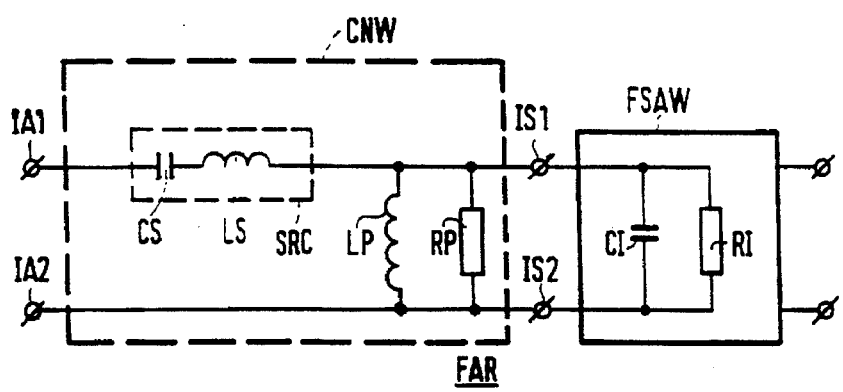
FIG. 3 shows a first embodiment of a filter arrangement according to the invention.

FIG. 3 shows a first embodiment of a filter arrangement according to the invention, in which a resistor RP is coupled between the input terminals IS1 and IS2 of the SAW filter FSAW. The band-pass filter constituted the coupling network CNW and the input capacitance CI, is terminated by a resistance equivalent to the resistor RP and input resistance RI in parallel.

Figure 4:
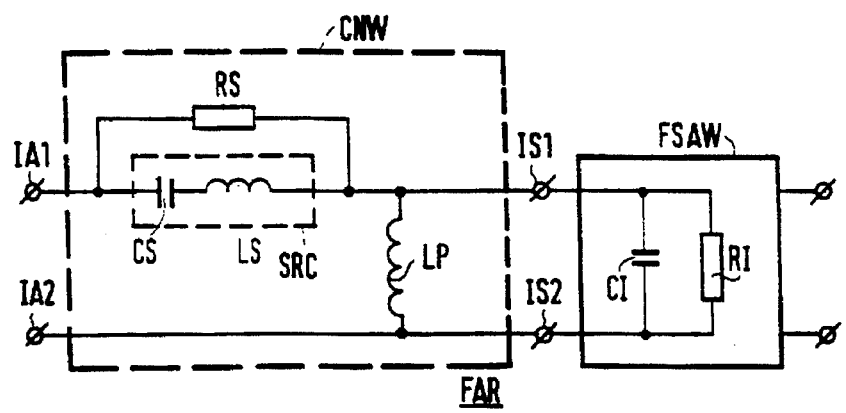
FIG. 4 shows a second embodiment of a filter arrangement according to the invention.

FIG. 4 shows a second embodiment of a filter arrangement according to the invention, in which a resistor RS is coupled in parallel to the series resonance circuit SRC. When a voltage source is connected between the input terminals IA1 and IA2, the node of the resistor RS which is connected to the input terminal IA1, is virtually grounded. Consequently, the resistor RS can effectively be transposed to obtain a circuit as shown in FIG. 3. When the voltage source has zero impedance, the band pass filter formed by the coupling network CNW and the input capacitance CI, is effectively terminated by a resistance equivalent to the resistor RS and input resistance RI in parallel. When the voltage source has not zero impedance, the effect remains that the terminating resistance of the band pass filter is affected by the resistor RS. However, advantageously, the impedance of the voltage source is an order of magnitude lower than the value of resistor RS.

Figure 5:
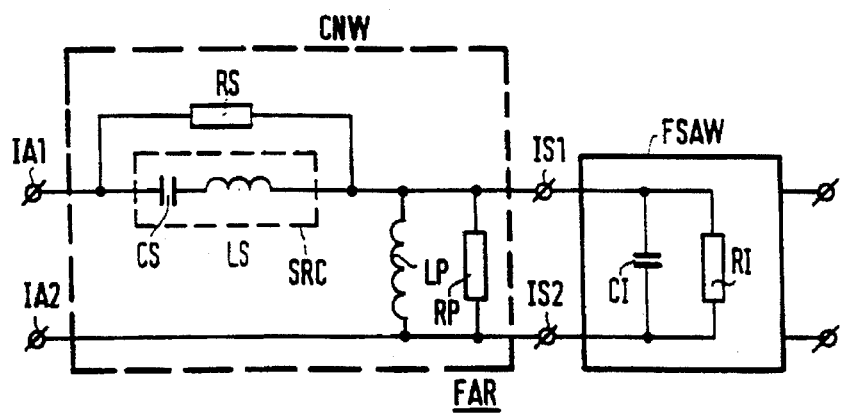
FIG. 5 shows a third embodiment of a filter arrangement according to the invention.
Figure 6:
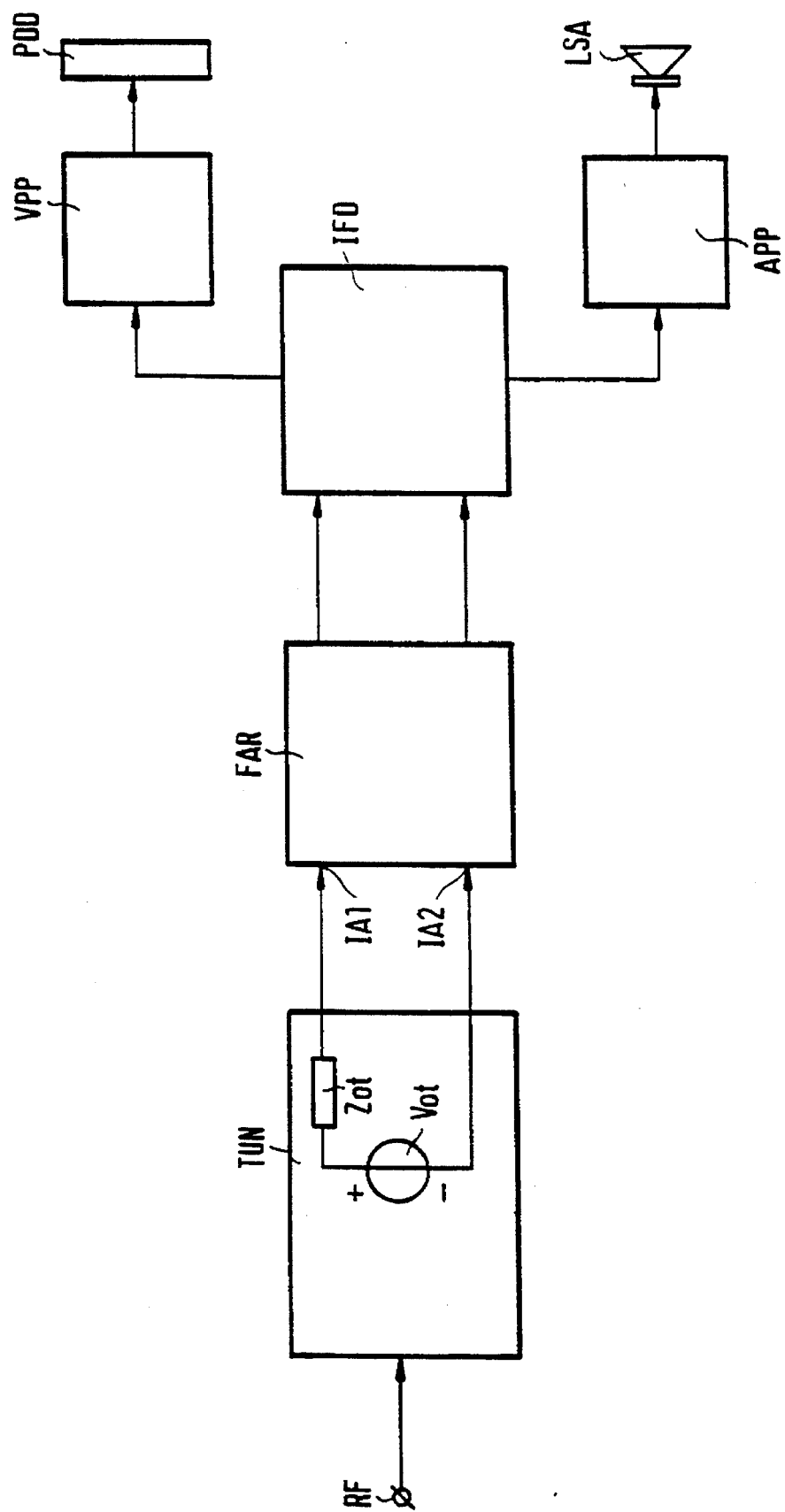
FIG. 6 shows a television receiver according to the invention.

FIG. 5 shows a third embodiment of a filter arrangement according to the invention, which essentially is a combination of the foregoing embodiments. Both the series resonance circuit SRC and the input of the SAW filter FSAW have resistors coupled in parallel, RS and RP, respectively. The FIG. 5 embodiment can be seen as the result of a split-up of the resistor RP in FIG. 3 or, alternatively, a split-up of the resistor RS in FIG. 4. Referring to FIG. 3, the resistor RP can be split up into two resistors RP1 and RP2 in parallel, not shown, which in parallel provide the same resistance as the resistors RP. Resistor RP2 can be transposed to become coupled in parallel to the series resonance circuit SRC. In effect, the node of RP2, which connected to ground, is disconnected and reconnected to the input terminal IA1. Input terminals IA1 is virtual ground, when the source impedance between terminals IA1 and IA2 approximates zero. The resistor RS in FIG. 5 can be seen as the transposed resistor RP2 the non-transposed resistor RP1 is equivalent to resistor RP in FIG. 5.

FIG. 6 shows a television receiver (TV), in which any of the FIGS. 3, 4 and embodiments can be applied. In the FIG. 6 TV, a tuner TUN converts a reception signal at an input terminal RF into to an intermediate frequency (IF) signal. A filter arrangement FAR filters the IF signal to obtain a filtered IF signal which is supplied to an IF and demodulation section IFD. The filter arrangement FAR can be any of the filter arrangements shown in FIGS. 3, 4 and 5. The IF and demodulation section IFD derives video and audio signals from the filtered IF signal supplied thereto. The video and audio signals are further processed in a video processing part VPP and an audio processing part APP, respectively, to obtain drive signals for a picture display device PDD and a loudspeaker arrangement LSA, respectively.

FIGS. 7a to 7d, FIGS. 8a to 8d and FIGS. 9a to 9d show characteristics of the filter arrangement FAR according to the FIGS. 3, 4 and 5 embodiment, respectively, when applied in the FIG. 6 TV. The following applies to the characteristics shown. The impedance Zot, shown in FIG. 6, at the output of tuner TUN which provides the IF signal, is 1 Ohm. The SAW filter FSAW is a typical TV SAW filter of which the input capacitance CI is 20 picoFarad and the input resistance RI is 1 kiloOhm. Further, the inductor LP has a value of 791.6 nanoHenry. Consequently, the resonance frequency of the parallel resonance circuit formed by inductor LP and capacitance CI is 40 Mhz. The series resonant circuit SRC is also tuned to 40 Mhz. Parameter R defines the values of the inductor LS and the capacitor CS, Ls and Cs, respectively: Ls=R·Lp, Cs=CI÷R.

More specifically, the value of the resistor RP in the FIG. 3 embodiment is 333 Ohms. The value of the resistor RS in the FIG. 4 embodiment is also 333 Ohm. The values of the resistor RS and the resistor RP in the FIG. 5 embodiment are 500 Ohm and 1000 Ohm, respectively, such that, when effectively arranged in parallel, these resistors also provide a resistance of 333 Ohms.

Figure 7A:
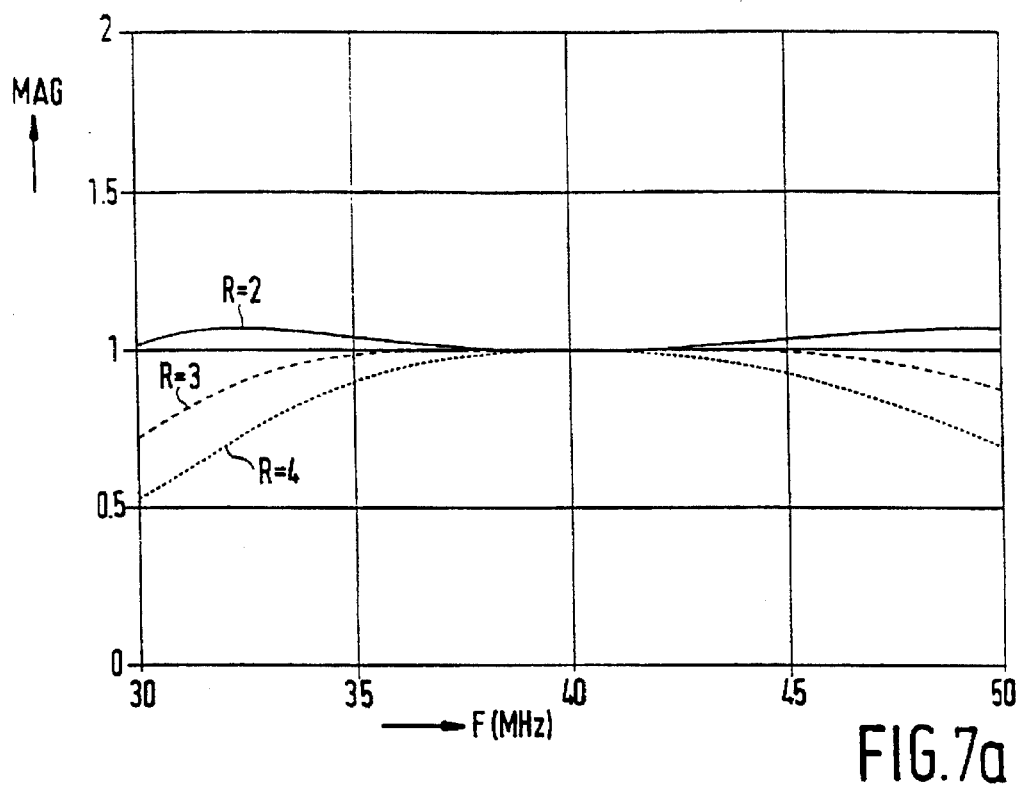
FIGS. 7a, 8a and 9a illustrate voltage gain in the FIG. 3, FIG. 4 and FIG. 5 embodiments, respectively.
Figure 8A:
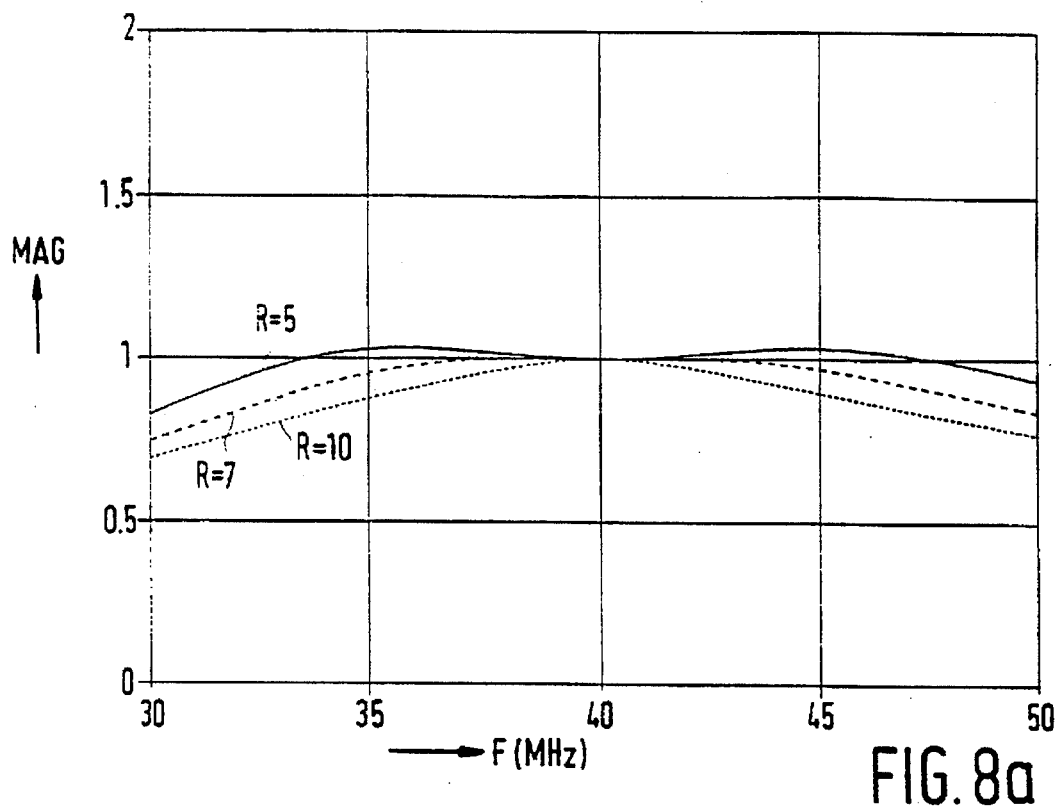
Figure 9A:
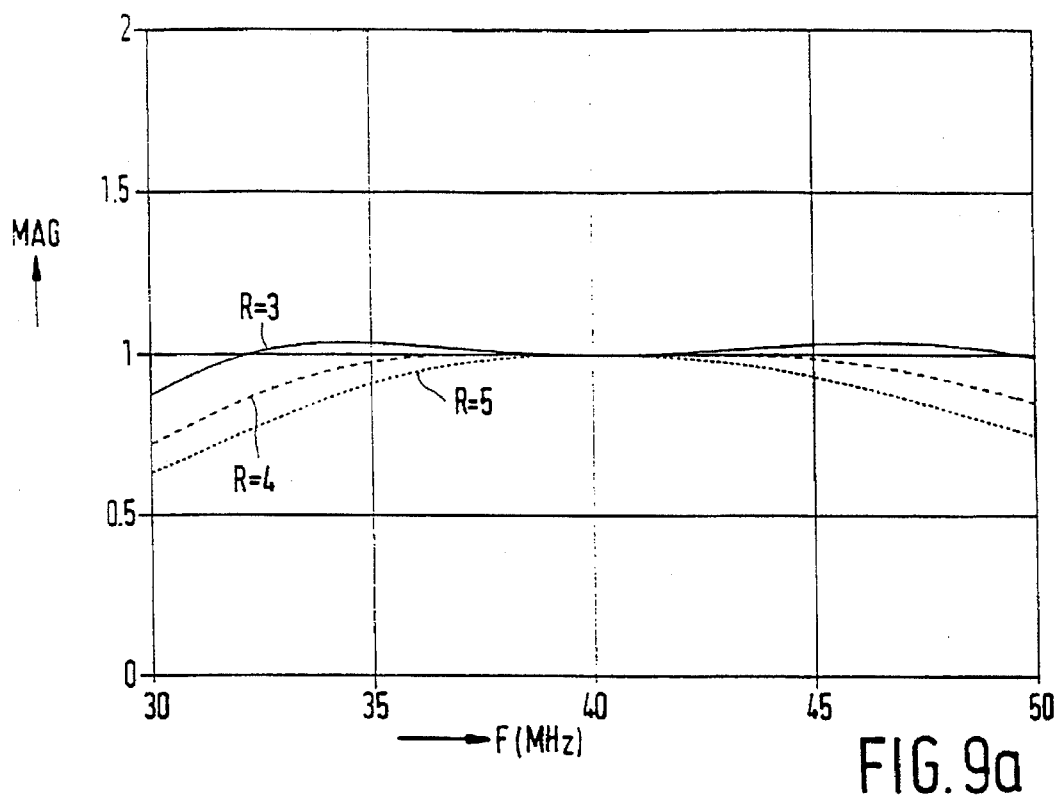
Figure 9B:
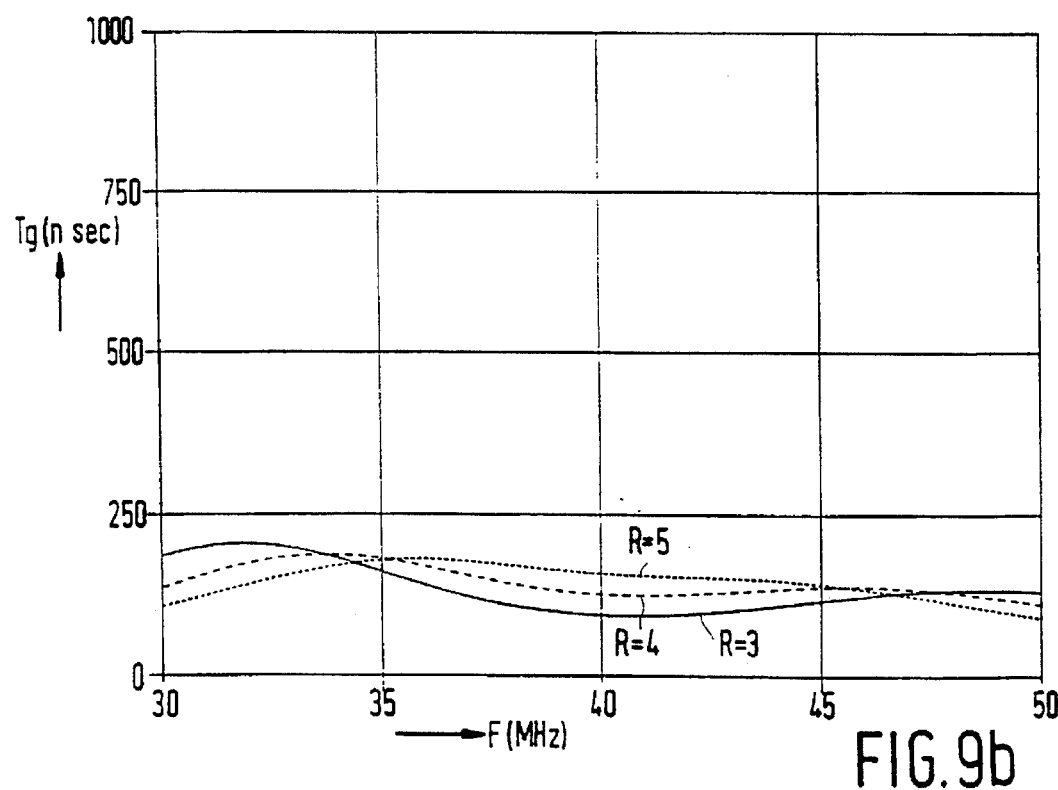

FIGS. 7a, 8a and 9a are the same types of graphs as FIG. 2a. FIGS. 7a, 8a and 9a show the magnitude (MAG) versus frequency (F) response of the transfer of a tuner output voltage Vot, indicated in FIG. 6, to the input of the SAW filter FSAW in the filter arrangement FAR.

Figure 7B:
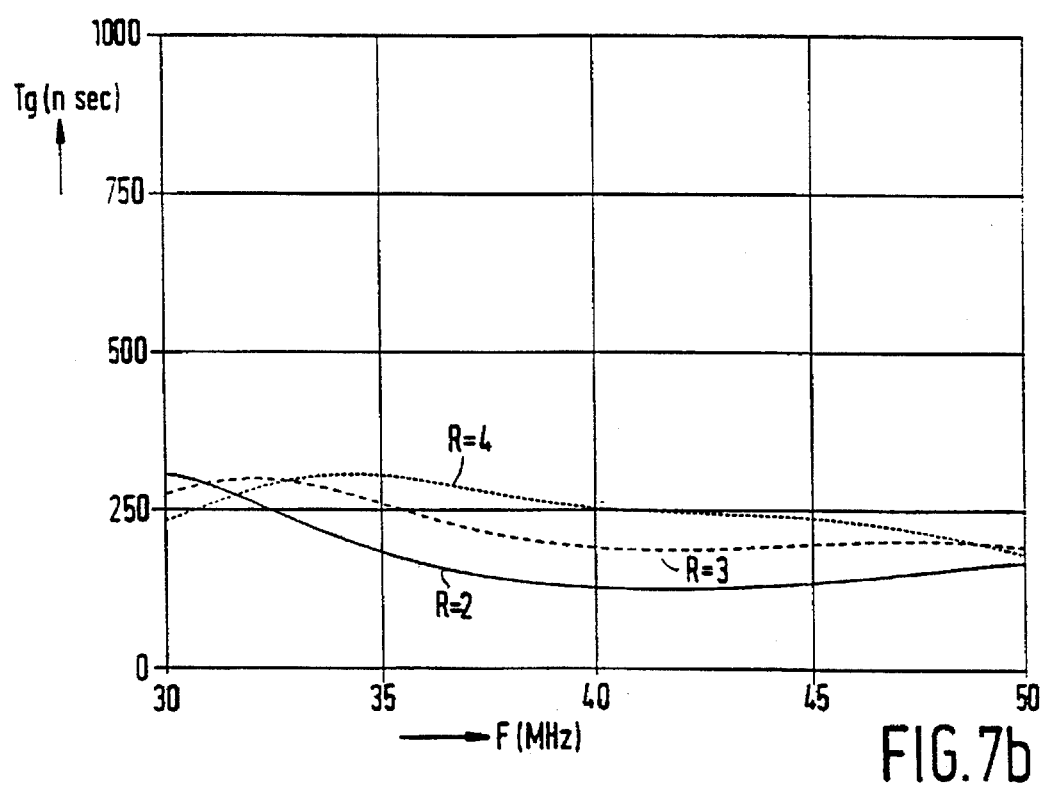
FIGS. 7b, 8b and 9b illustrate group delay in the FIG. 3, 4 and 5 embodiments, respectively.
Figure 8B:
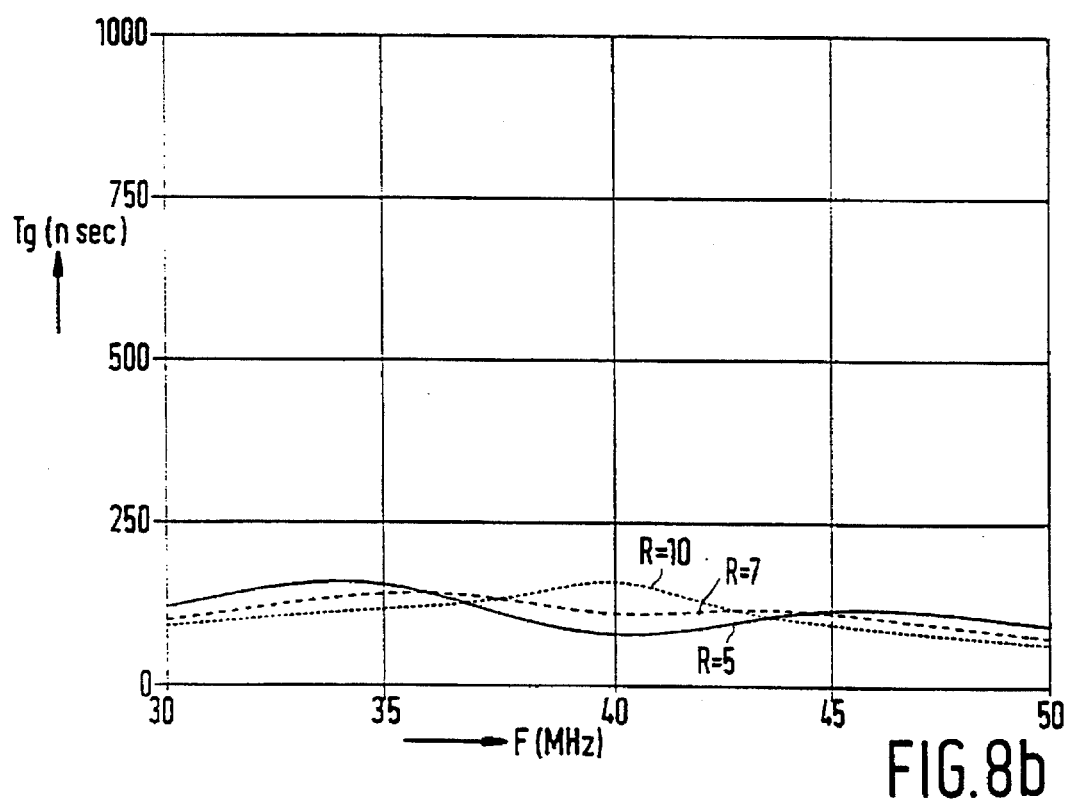

FIGS. 7b, 8b and the same types of graphs as FIG. 2b. FIGS. 7b, 8b and show the group delay (Tg) frequency (F) response of the transfer of the tuner output voltage Vot to the SAW filter FSAW in the filter arrangement FAR.

Figure 7C:
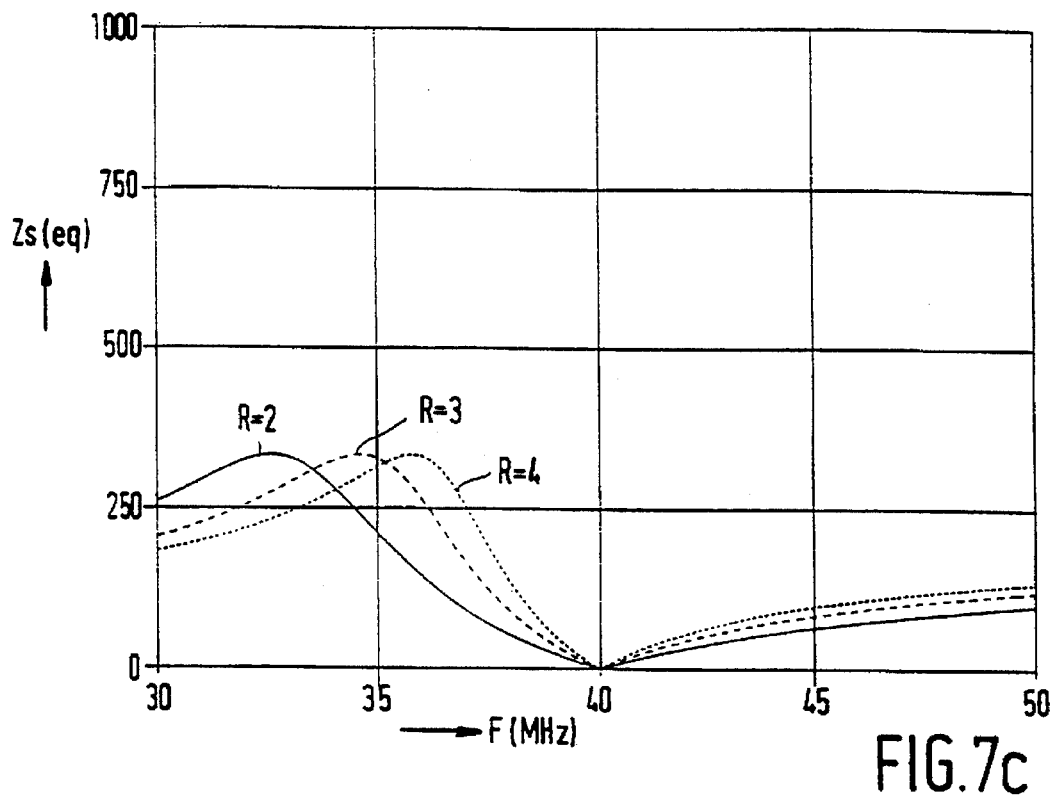
FIGS. 7c, 8c and 8c illustrate the equivalent source impedance at the SAW filter input in the FIG. 3, 4 and 5 embodiments, respectively.
Figure 8C:
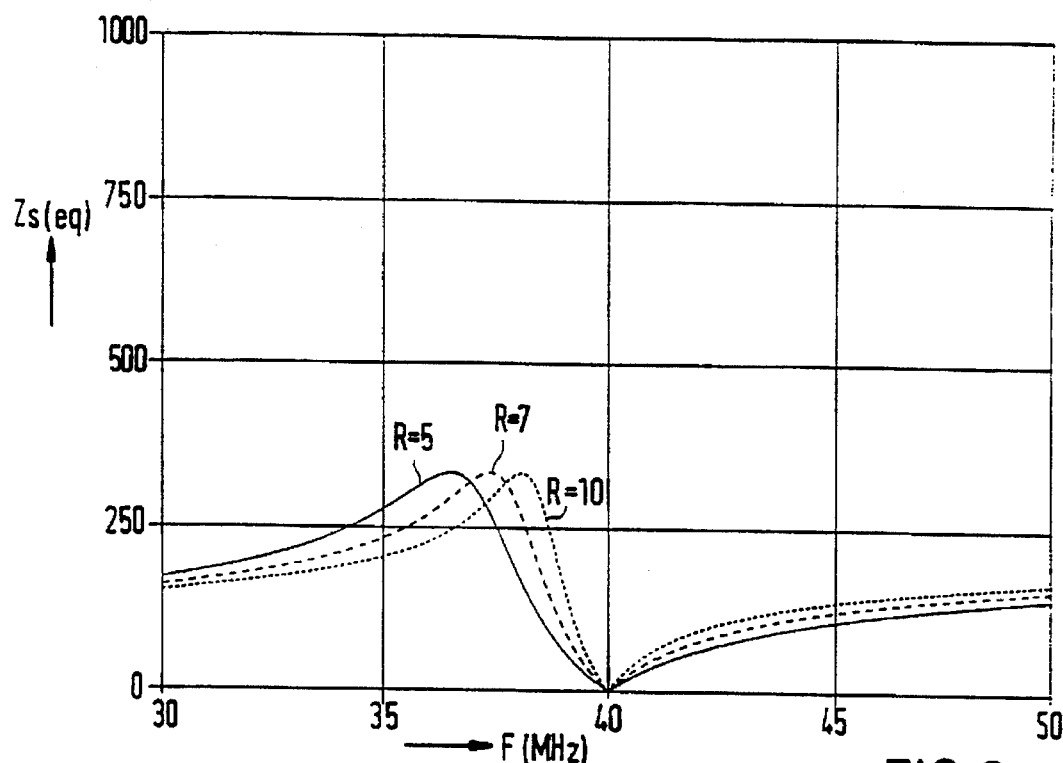
Figure 9C:
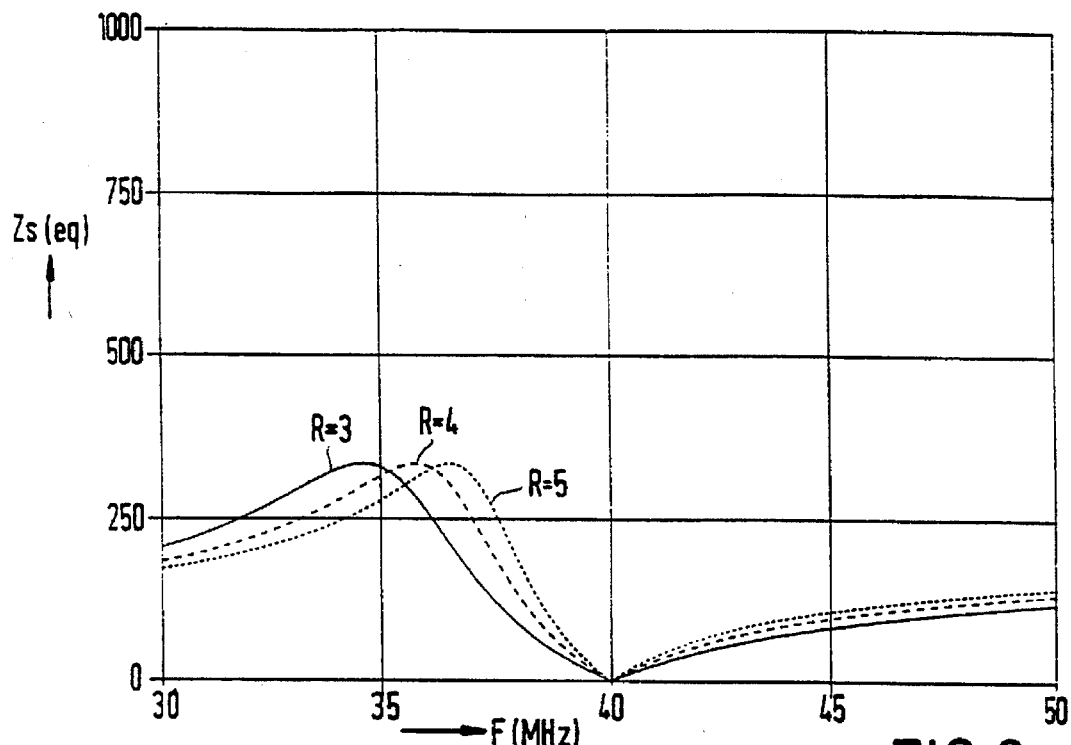

FIGS. 7c, 8c and 9c are the same types of graphs as FIG. 2c. FIGS. 7c, 8c and 9c show the equivalent source impedance Zs(eq), seen at the input of the SAW filter FSAW, as a function of frequency (F). The equivalent source impedance Zs(eq) corresponds to the output impedance of the coupling network CNW when coupled to the tuner TUN.

Figure 7D:
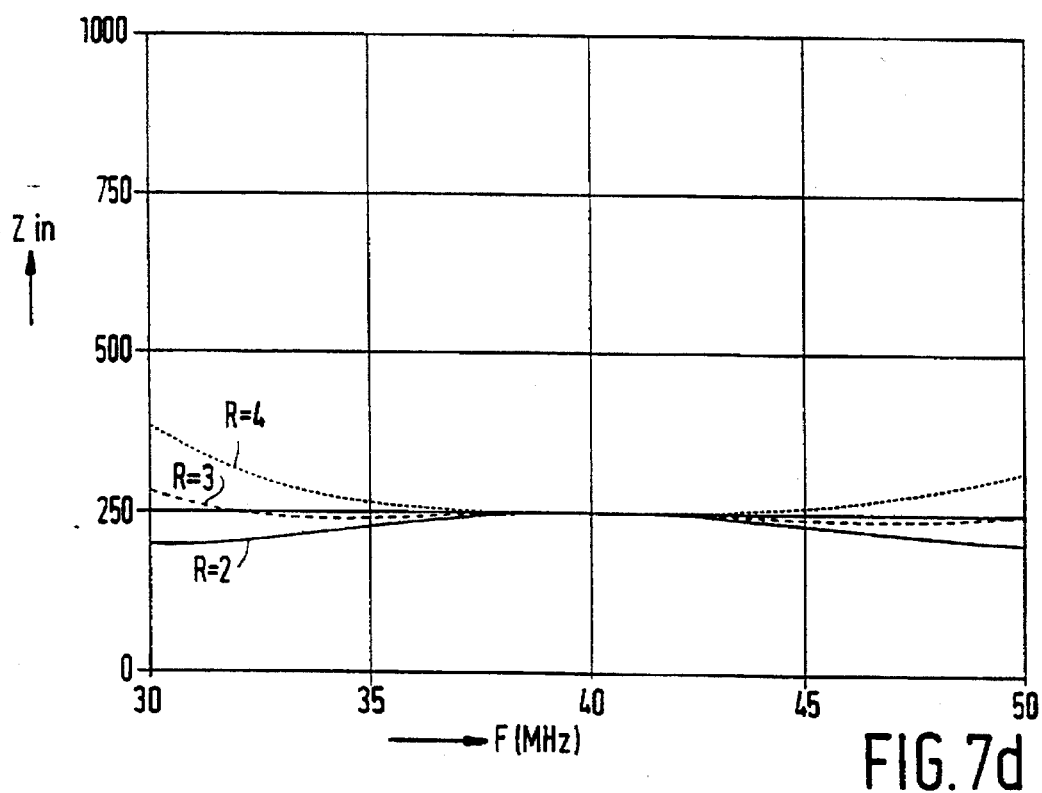
FIGS. 7d, 8d and 9d illustrate the input impedance of the FIG. 3, 4 and 5 embodiments, respectively.
Figure 8D:
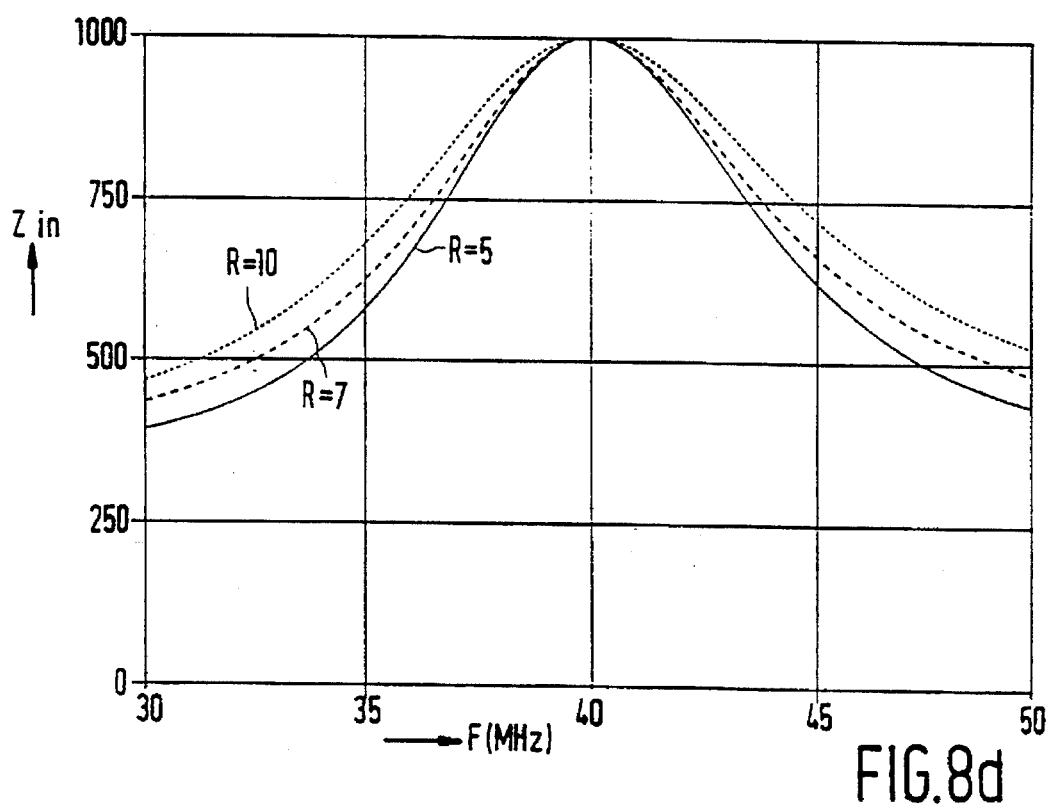
Figure 9D:
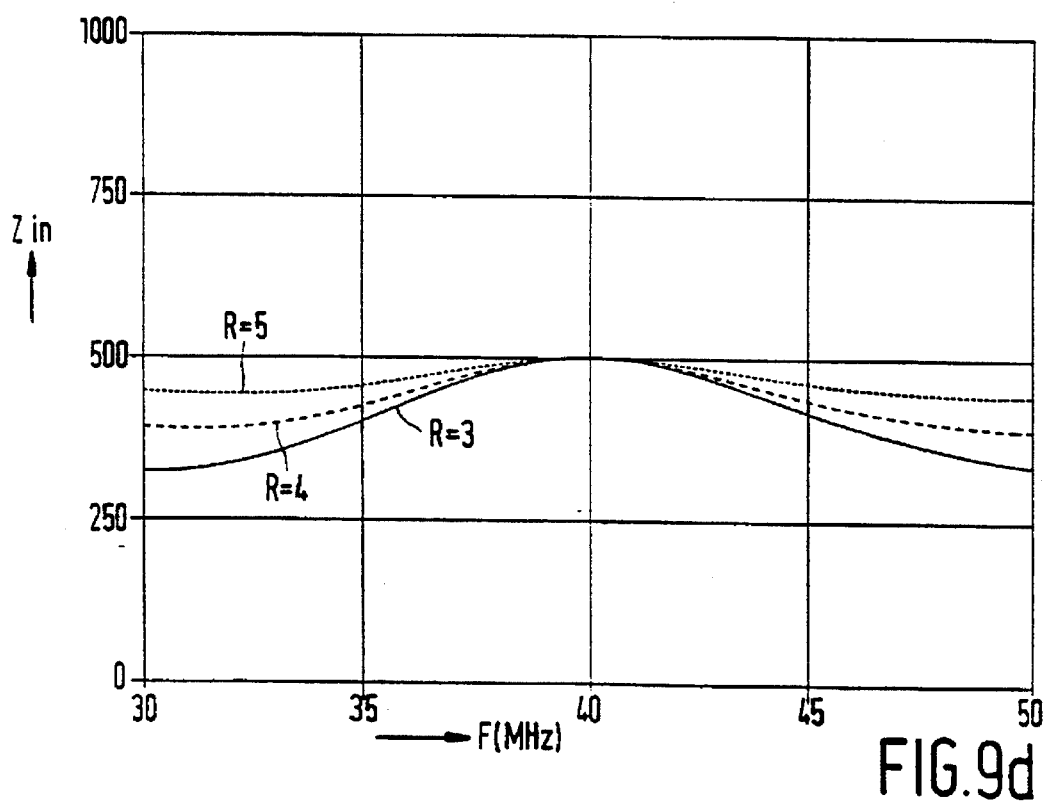

FIGS. 7d, 8d and 9d are the same types of graphs as FIG. 2d. These Figs. show the input impedance Zin of the filter arrangement FAR. The input impedance Zin is the load impedance seen by the tuner TUN at the output which provides the IF signal.

Highlighted here below are advantages provided by the invention and additional features. This with reference to the embodiments presented above.

In the FIG. 6 TV, when equipped with any of the FIGS. 3, 4 or 5 filter arrangements FAR, the IF signal is less distorted than if the FIG. 6 TV is equipped with the prior art filter arrangement, shown in FIG. 1. This can be understood from the following characteristics.

The magnitude-frequency response shown in FIGS. 7a, 8a and 9a is substantially flat over the pass band, in particular when R=3, 7 and 4, respectively. Also, the group delay is substantially constant over the pass band for these values of R as apparent from FIGS. 7b, 8b and 9b. Moreover, the magnitude-frequency responses in FIGS. 7a, 8a and 9a do not have significant peaks outside the pass-band which may affect selectivity.

The equivalent source impedance Zs(eq) shown in FIGS. 7c, 8c and 9c, peaks to a maximum of 333 Ohms, which is considerably less than in FIG. 2c which relates to the prior art. The maximum of 333 Ohms is defined by the resistor RP, and/or the resistor RS. Furthermore, it should be noted that the peaks in FIGS. 7c, 8c and 8c are not within the 6 Mhz pass band.

In the FIG. 6 TV, when equipped with any of the FIGS. 3, 4 or 5 filter arrangements FAR, IF filter characteristics are well-defined. This due to the relatively low equivalent source impedance at the input of the SAW filter FSAW. SAW filter characteristics specified by manufactures generally apply to a test circuit in which the SAW filter concerned is driven by a source with a relatively low impedance. Consequently, in any implementation of the SAW filter, the equivalent source impedance at the SAW filter input should, preferably, be relatively low too. If not, the filter characteristics can deviate from those specified by the manufacturer.

In the FIG. 6 TV, when equipped with any of the FIGS. 3, 4 or 5 filter arrangements, IF filter characteristics are less sensitive to component value spread, than when the FIG. 6 TV is equipped with the prior art filter arrangement. This can be appreciated by comparing FIGS. 2a and 2b, on the one hand, and FIGS. 7a, 8a, 8b, 9a and 9b, on the other hand.

In the FIG. 6 TV, signal handling properties can be optimized when the FIG. 5 filter arrangement FAR is applied. The signal handling properties depend, inter alia, on the input impedance Zin of the filter arrangement FAR. To that respect, the FIG. 5 embodiment provides the following advantage. The response of the input impedance Zin against frequency (F), can be influenced by the choice of resistors RS and RP, while keeping the resistance of these resistors in parallel constant. In a sense, the FIGS. 3 and 4 embodiments can be considered as two extreme cases of the embodiment shown in FIG. 5. FIG. 3 corresponds to FIG. 5 when the value of resistor RS is infinite. FIG. 4 corresponds to FIG. 5 in when the value of resistor RP is infinite. In the FIG. 3 embodiment, the input impedance Zin within the pass band is lower than in the FIG. 4 embodiment. On the other hand, in the FIG. 3 embodiment, the input impedance Zin is higher at frequencies sufficiently far from the pass band, than in the FIG. 4 embodiment.

With the FIG. 5 embodiment, a compromise between in-band and out-band large signal handling can be made. The input impedance Zin characteristic can be optimized in view of the properties of tuner TUN, for example, relating to Automatic Gain Control and/or RF selectivity. For example, the tuner TUN in FIG. 6 may significantly suppress undesired signals more than 10 MHz frequency adjacent from the desired signal. In that case, the input impedance of the filter arrangement FAR at more than 10 Mhz from the IF can be relatively low. Due to the tuner selectivity, the out-band undesired signals will be relatively weak, which prevents an output current overload of the tuner TUN.

The resistors RS and RP, in the FIGS. 3, 4 and 5 embodiments, do not substantially affect the noise figure and insertion loss within the pass band. In the pass band, the noise of the resistor RS is effectively short circuited by the series resonance circuit SRC. This equally applies to the noise of the resistor RP, when a low impedance source is coupled between the input terminals IS1, IS2. Furthermore, in the FIGS. 4 and 5 embodiments, a pass band signal applied at the input terminals IS1, IS2 will by-pass the resistor RS via the series resonance circuit SRC. Accordingly, substantially no desired signal power will be dissipated by the resistor RS. Hence, the resistor RS does not substantially contribute to the insertion loss of the filter arrangements shown in FIGS. 4 and 5.

While a limited number of embodiments are shown and described by way of example, a person skilled in the art may conceive many other embodiments, which are within the scope of the invention claimed.

Instead of TV applications, the invention can also advantageously be applied in other types of receivers, for example, in Digital Audio Broadcast (DAB) receivers. It is expected that a typical DAB receiver will have an IF section which also comprises a SAW filter.

Instead of a 40 MHz center frequency, which was used by way of example in this specification, other center frequencies can be used. For example, in many Asian countries the TV IF is approximately 60 MHz. Furthermore, instead of a 6 Mhz bandwidth, another bandwidth may be more appropriate. For example, for satellite TV reception, a bandwidth of approximately 25 Mhz may be used.

Instead of one series resonant circuit, a plurality of series resonant circuits can be used to transfer an input signal to the SAW filter. For example, in FIGS. 3, 4 and 5 a further resonant circuit may be coupled in series with the series resonant circuit SRC. In addition, a parallel resonance circuit may be arranged between signal ground and the common node of the series resonant circuit SRC and the further series resonant circuit, not shown. Accordingly, a band-pass filter is obtained, which includes the SAW filter input capacitance CI, which band-pass filter is of a higher order than the one in the FIG. 3, 4 or 5 embodiments. Hence, it will be evident that further capacitors and inductors can be added to the coupling network CNW shown in FIGS. 3, 4 and 5, without departing from the basic principle of the invention.

Referring to FIGS. 3, 4, 5, it is also possible to arrange a further series resonant circuit between the input terminal IA2 and the SAW filter input IS2. In that case, the filter arrangement is particularly suited for coupling to a driver circuit with a symmetrical output. Accordingly, when there is symmetry between the signal path from terminals IA1 to IS1 and from IA2 to IS2, the SAW filter arrangement will provide a symmetrical output signal. Advantageously, the inductors in these signal paths are magnetically coupled. This to obtain different transfer characteristics for symmetrical, output signals, also referred to as differential output signals, and asymmetrical signals, also referred to as common mode signals. For example, such a symmetrical coupling network may suppress common mode signals in the desired pass band such that the SAW filter is substantially driven by differential signals.

Referring to FIG. 6, the connections to signal ground of an input and an output of the filter arrangement FAR, is dispensed with when a symmetrical filter arrangement as described above is applied. In that case, a tuner TUN is used which provides a symmetrical output signal and an IF and demodulation section IFD is used which has a symmetrical input.

Finally, it should be noted that in a receiver according to the invention, components of the coupling network which precedes the SAW filter may be included in the tuner. For example, the series resonance circuit can be part of a tuner module, that is, a metallic box comprising tuner circuitry, whereas the SAW filter and the inductor coupled between its input terminals are outside the tuner module. Hence, the partitioning shown in FIG. 6 is rather functional than physical.

We claim:
1. A receiver comprising:
    a tuner for converting a reception signal into an intermediate frequency signal;
    a filter arrangement for filtering the intermediate frequency signal to obtain a filtered intermediate frequency signal; and
    a demodulation section for providing a baseband signal in response to the filtered intermediate frequency signal;
    characterized in that the filter arrangement comprises:
        a surface acoustic wave filter with two input terminals;
        an inductor coupled between the two input terminals;
        a series resonance network coupled to transfer the intermediate frequency signal to at least one of the two input terminals; and
        a resistor coupled between the two input terminals.
2. A receiver comprising:
    a tuner for converting a reception signal into an intermediate frequency signal;
    a filter arrangement for filtering the intermediate frequency signal to obtain a filtered intermediate frequency signal; and
    a demodulation section for providing a baseband signal in response to the filtered intermediate frequency signal;
    characterized in that the filter arrangement comprises:
        a surface acoustic wave filter with two input terminals;
        an inductor coupled between the two input terminals;
        a series resonance network coupled to transfer the intermediate frequency signal to at least one of the two input terminals; and
        a resistor coupled in parallel to the series resonance network.
3. A receiver according to claim 2, wherein a further resistor is coupled between the two input terminals.
4. A receiver according to claim 2, wherein the tuner as an output for providing the intermediate frequency signal, the output having an impedance which is a magnitude lower than the value of said resistor.
5. A filter arrangement comprising:
    a surface acoustic wave filter with two input terminals;
    an inductor coupled between the two input terminals; and
    a series resonance network coupled to transfer an input signal to at least one of the two input terminals,
    characterized in that a resistor is coupled between the two input terminals.
6. A filter arrangement comprising:
    a surface acoustic wave filter with two input terminals;
    an inductor coupled between the two input terminals; and
    a series resonance network coupled to transfer an input signal to at least one of the two input terminals,
    characterized in that a resistor is coupled in parallel to the series resonance network.
7. A filter arrangement according to claim 6, wherein a further resistor, coupled between the two input terminals.

* * * * *